United States Patent [19]
Brünn et al.

[11] Patent Number: 5,192,850
[45] Date of Patent: Mar. 9, 1993

[54] PROCESS AND CIRCUIT FOR REGULATING WELDING CURRENT AND POWER AS A FUNCTION OF WELDING SPEED

[75] Inventors: Rainer Brünn, Essel; Wolfram Klebl, Isernhagen, both of Fed. Rep. of Germany

[73] Assignee: Kabelmetal Electro GmbH, Hanover, Fed. Rep. of Germany

[21] Appl. No.: 683,995

[22] Filed: Apr. 11, 1991

[30] Foreign Application Priority Data

Apr. 11, 1990 [DE] Fed. Rep. of Germany ....... 4011647
May 4, 1990 [DE] Fed. Rep. of Germany ....... 4014275

[51] Int. Cl.$^5$ .................. B23K 9/095; B23K 26/00
[52] U.S. Cl. ............................ 219/130.21; 219/61; 219/121.63
[58] Field of Search ............ 219/61, 130.21, 137 PS, 219/124.5, 121.62, 121.63

[56] References Cited

U.S. PATENT DOCUMENTS

| 3,261,960 | 7/1966 | Lehnert | 219/130.21 |
| 3,286,074 | 11/1988 | Lehnert et al. | 219/130.21 |
| 3,619,554 | 11/1971 | Klebl | 219/61 |
| 3,626,146 | 12/1971 | Smith | 219/130.21 |
| 4,649,256 | 3/1987 | Minamida et al. | 219/121.63 |

Primary Examiner—Clifford C. Shaw
Attorney, Agent, or Firm—Ware, Fressola, Van Der Sluys & Adolphson

[57] ABSTRACT

To regulate welding current and power as a function of welding speed in welding devices for continuous longitudinal-seam welding of metal bands formed into a tube, a speed-dependent voltage value is added to an adjustable fixed voltage value.

18 Claims, 3 Drawing Sheets

PROCESS AND CIRCUIT FOR REGULATING WELDING CURRENT AND POWER AS A FUNCTION OF WELDING SPEED

BACKGROUND OF THE INVENTION

1. Field of the Invention

The present invention relates to a process and a circuit for regulating welding current and power as a function of welding speed in welding devices for continuous longitudinal-seam welding of metal bands formed into a tube.

2. Description of the Prior Art

A circuit arrangement is already known (German OS 19 00 856 corresponding to U.S. Pat. No. 3,619,554) in which the electrodes of a welding device are affected from a voltage source via a transformer, a control element adjusting the welding current, and a speed-dependent tachogenerator. In this case, means is provided for controlling the magnitude of the welding current as a function of the supply voltage, the electrode distance and temperature variations.

In a control circuit of this type, for DC welding, the actual welding current is continuously measured and, by means of disturbance-variable compensation, the control element is affected in the case of even very small variations, so that the welding current corresponds to the requirements in each case. The adjustment in this case can be carried out promptly, so that variations in the supply voltage, the electrode distance or temperature changes are not noticeable with regard to the welding current, but the magnitude of the welding current always takes on the value required for thorough welding of the weld in each case.

However, problems arise when higher manufacturing speeds are required and different metals or band thicknesses are used. This is because high manufacturing speeds permit the disturbing effect of the waviness of the welding current to increase, so that it is no longer assured that satisfactory welds can be produced with known control devices.

To provide a remedy in this case, it would be possible to incorporate filter elements in the control circuit, but there are limits to a significant enlargement of such filter networks because of the time constants of the control circuit. The replacement of the known control elements, for example by transistors, also does not always produce the desired effect or makes additional expenses necessary, for example, by the fact that the excess energy must be removed by means of suitable coolants, such as water or air.

SUMMARY OF THE INVENTION

The invention is therefore based on the task of controlling the welding current or power, when a laser welding device is used, as a function of the manufacturing speed, to insure the problem-free welding of any desired metals and metal bands of different band thicknesses with an optimal form of the welding current.

This problem is solved according to the invention by the fact that a speed-dependent voltage value is added to an adjustable fixed voltage value. The establishment of a fixed voltage value, for example, as a function of the selected band thickness, causes a zero point shift in the current-speed diagram, while the addition of the speed-dependent voltage value leads to the welding current or welding load characteristic starting at the particular zero point. This measure makes possible the selection of any desired current or power values as a function of the welding speed, and adaptation to any given welding conditions is possible.

To carry out the invention, for the case of a DC arc-welding system, a circuit that has proved suitable includes welding electrodes supplied from a voltage source via a transformer, a control element for adjusting and rectifying the welding current. The control element is affected by a speed-dependent tachogenerator which is connected to a controller. It is important in this case that an adjustable fixed voltage source is connected in series with the tachogenerator. In this case, the tachogenerator supplies a speed-dependent voltage of, for example, 0-20 V, while the adjustable fixed voltage source, such as any desired stepping switch, makes available a base voltage of 0-10 V.

The voltages are added and are then supplied to one input of a welding-current controller, while the actual value of the welding current is introduced at another input, coming from a current transformer. A comparison between the control value and actual value in the welding current then leads to the necessary welding current at the output.

Another advantageous possibility in practicing the invention contemplates a circuit including welding electrodes supplied from a voltage source via a transformer and a control element for adjusting and rectifying the welding current. The control element is affected by a welding-speed-dependent tachogenerator which is connected to a controller. In this case, the outputs of the tachogenerator and a fixed voltage source are separately connected with the inputs of a summation amplifier, whose output acts on an input of the welding current controller, while another input of this controller is connected to the DC transformer. In this arrangement, a direct reciprocal effect in the addition of the two voltage values is ruled out, and clear electrical conditions are created. The output voltage of the summation amplifier is then, as already mentioned above, again supplied to one input of a welding current controller, while the other input of this controller is supplied with the actual value of the welding current from the current transformer.

A further improvement of the welding-current control is ensured by the fact that a voltage divider is provided between the output of the tachogenerator and the input of the summation amplifier. By means of this, the slope of the welding current characteristic can be adjusted.

If, instead of the above-mentioned DC arc-welding systems, laser welding devices are involved, e.g., in the form of a $CO_2$ laser, then the added voltage values will be supplied to a corresponding controller of the laser, or the output of the summation amplifier will be allowed to act on the input of the laser controller.

The task of the invention, of ensuring optimal conditions for the welding of metal bands formed into a tube by a reduction of the waviness of the welding current, includes a further development of the invention. A welding current control circuit includes welding electrodes supplied from a voltage source via a transformer, and a control element for adjusting and rectifying the welding current. The control element is affected by a welding-speed-dependent tachogenerator, which is connected to a controller. In such a circuit, the control element is a thyristor/rectifier arrangement, which is controlled by a series-connected transistor unit driven by the controller. An arrangement of this type leads to a reduction of the power loss in the transistors, so that the need for very expensive cooling of these switching elements can be omitted. At the same time, however, when using the invention, one makes use of the advantage of short control times resulting from the use of the transistors. The thyristor/rectifier arrangement is controlled in such a way that the voltage drop at the transistors, and the power loss caused thereby, is held to a minimum.

In carrying out the invention, it has proved appropriate to provide an additional regulating amplifier in a return loop from the transistor unit to the thyristor/rectifier arrangement. In this way, a problem-free control of the thyristor/rectifier is possible, which also applies for high manufacturing speeds.

In order to insure optimal conditions for the welding of metal bands formed into a tube by reducing the waviness of the welding current, it is possible, in a further development of the invention, to use higher-pulse rectifier arrangements as the control element, for example, one can resort to a 12-pulse rectifier unit.

DESCRIPTION OF THE DRAWINGS

The invention will be explained in greater detail in the exemplifying embodiments shown in FIGS. 1-5, wherein.

DETAILED DESCRIPTION OF THE PREFERRED EMBODIMENT

Figure 1:
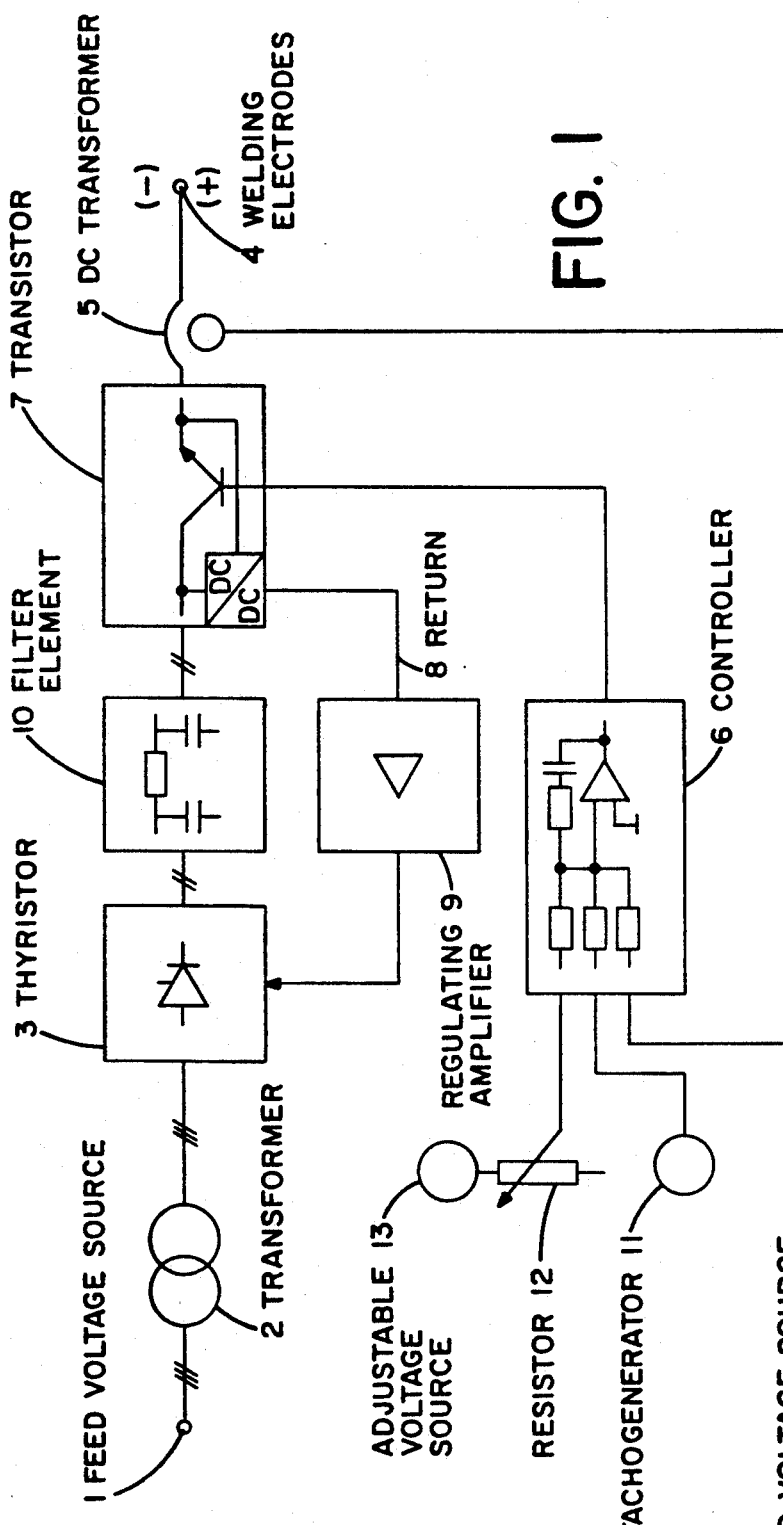
FIG. 1 shows a block diagram of a first embodiment of the invention.

As can be seen from FIG. 1, 1 designates a feed voltage source, which can be, for example, a 50-Hz AC network. A transformer 2 has a primary side connected to the voltage source 1 and a secondary side connected to a thyristor 3. Between electrodes 4, which are designated by (+) and (−), of the welding device (not shown) and the thyristor 3 there is connected a DC transformer 5, on the secondary side of which a voltage corresponding to the actual value of the welding current can be taken off. A controller 6 receives its energy supply via a power supply unit (not shown).

As is known, the thyristor/rectifier arrangement 3 becomes non-current-transmitting during each zero passage of the voltage and must then be re-ignited in each AC cycle. This ignition is carried out by means of the controller 6, which sets the ignition time of the thyristor earlier or later, depending on the circumstances, so that correspondingly more or less current reaches the welding electrodes 4. This control of the thyristor unit 3 by the controller 6 is not carried out directly but, as shown, via the transistor unit 7, which is connected in series with the thyristor/rectifier arrangement 3, but has a return 8 to this, by means of which the thyristor arrangement is controlled via a regulating amplifier 9 in such a way that the voltage drop at the transistor 7, and thus the power loss, can be kept to a minimum. Through the use of the transistor unit 7, on the other hand, the adjustability if further improved, and a significant decrease in the waviness of the welding current is achieved even at high take-off rates. A further improvement can be achieved by the fact that, as can be seen from FIG. 1, a filter element 10 is located between the thyristor/rectifier arrangement 3 and the series-connected transistor unit 7.

As already stated, it can sometimes be advantageous for the invention if the controller 6 is subjected to a voltage that is composed of an adjustable fixed-voltage value and a speed-dependent voltage value. To achieve this, an addition circuit made up of a tachogenerator 11 and a voltage source 13 adjustable via a resistor 12 is provided. The voltage value resulting from the elements 11 and 13 is applied to the controller 6, which is also connected to the DC transformer 5, and from this obtains a signal corresponding to the actual DC current, which is then compared with the voltage value supplied by the tachogenerator 11 and the adjustable voltage source 13 and is used for control.

Figure 2:
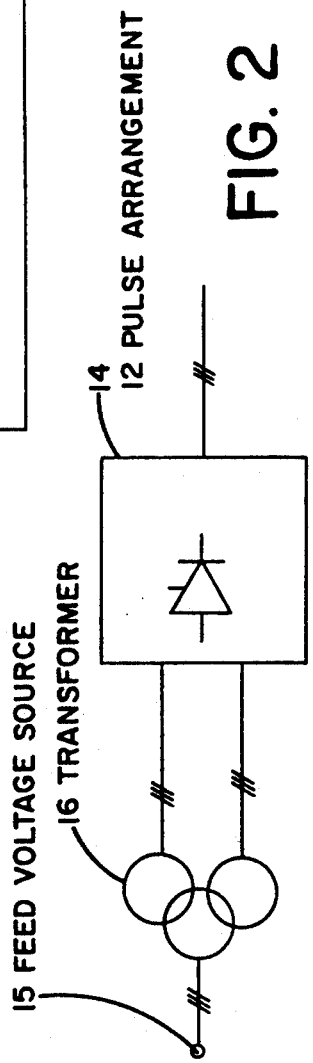
FIG. 2 shows a modified embodiment of the invention of FIG. 1.

In difference from the exemplifying embodiment shown in FIG. 1, FIG. 2 shows an arrangement in which, for example, the 6-pulse thyristor/rectifier arrangement 3 is replaced by a 12-pulse arrangement 14. Accordingly, a transformer 16 supplied by a supply voltage source 15 is also equipped with a second secondary winding. All other switching elements of the circuit arrangement according to the invention correspond to those that were used in FIG. 1 for execution of the invention.

Figure 3:
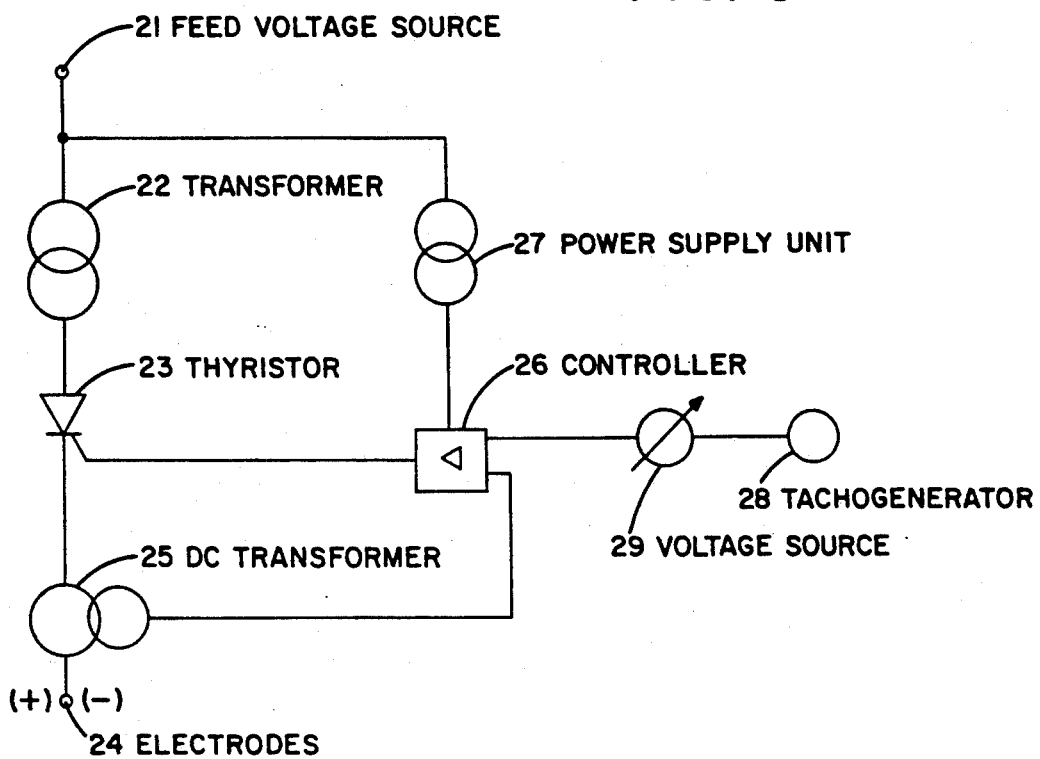
FIG. 3 shows a block diagram of a second embodiment of the invention.

As can be seen from FIG. 3, 21 denotes a supply voltage source, which can be, for example, a 50-Hz network. Connected to the voltage source 21 is a transformer 22, which is connected with a thyristor 23 on the secondary side of the transformer. Between the electrodes 24 of the welding device, designated by (+) and (−), and the thyristor 23, there is connected a DC transformer 25, on the secondary side of which a voltage corresponding to the actual value of the welding current can be taken off. A controller 26 receives its energy supply via a power supply unit 27. The thyristor 23, as already mentioned above, becomes non-current-transmitting during each zero passage of the source voltage and must then be re-ignited in each cycle. This ignition is carried out by the controller 26, which sets the ignition time of the thyristor 23 earlier or later, depending on the circumstances, so that correspondingly more or less current reaches the welding electrodes 24.

It is significant for the invention that the controller 26 is subjected to a voltage made up of an adjustable fixed voltage value and a speed-dependent voltage value. To achieve this, an addition circuit made up of a tachogenerator 28 and an adjustable voltage source 29 is provided. The voltage value determined from 28 and 29 is applied to the controller 26, which is also connected with the DC transformer 25, and from this obtains a signal corresponding to the actual welding current value, which is then compared with the voltage value supplied by the tachogenerator 28 and the adjustable voltage source 29 and is used for control. The DC transformer 25 can also be made up of a shunt with a series-connected buffer amplifier.

It is to be understood that the invention is equally applicable to a laser welding device instead of a DC arc-welding system, in which case the electrodes in the various embodiments would be replaced by a laser such as a $CO_2$ laser which could be controlled directly by the output of the controller.

Figure 4:
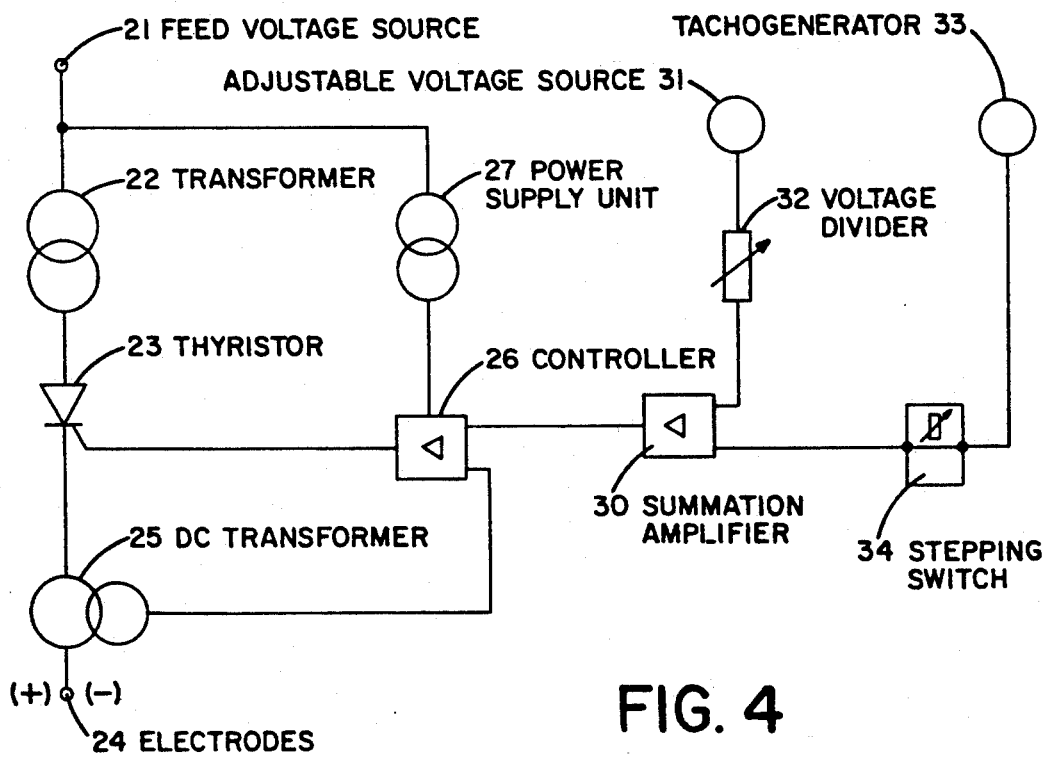
FIG. 4 shows a block diagram of a modified embodiment of the invention of FIG. 3.

In deviation from this, FIG. 4 shows an arrangement in which a summation amplifier 30 of a commercial design is used for addition of two voltage values. The output of a summation amplifier is connected with one input of the controller 26 or with the input of, for example, an adjustable high-frequency generator which controls the output power of a welding laser, while the other input is connected to the current transformer 25. The fixed voltage value required for the addition is supplied from an adjustable voltage source 31 to one input of the summation amplifier 30, with the adjustment of the particular voltage value being carried out by a voltage divider 32. The speed-dependent part is supplied by a tachogenerator 33, with the slope of the speed-dependent characteristic being adjustable by means of a stepping switch 34.

Figure 5:
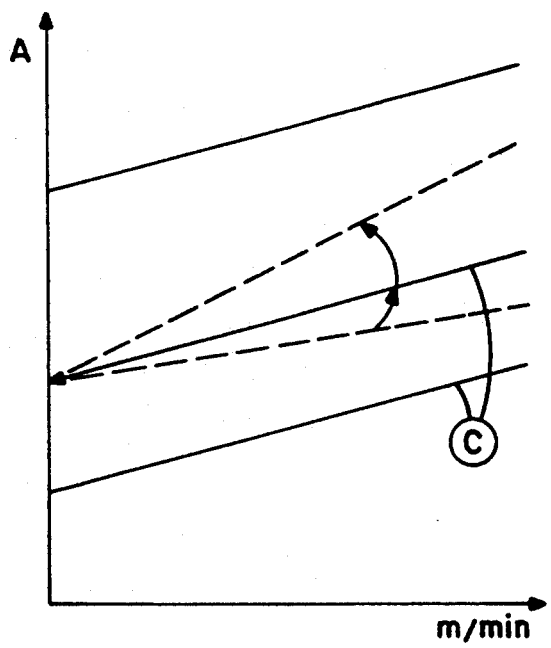
FIG. 5 is a graph showing welding speeds vs. welding current.

The mode of action of the circuits described in FIGS. 3 and 4 is shown in a diagram in FIG. 5, in which the welding speed in meters/minute is clocked against the welding current in amperes. The fixedly adjustable voltage value supplied to the summation amplifier 30 leads to a specific base current, and a change in this voltage value, as can be seen from the figure, leads to a parallel displacement of the zero point in the connection of the current access or to a corresponding parallel shift of the family of curves C. It is also essential for the invention that the slope of the family of curves C can be changed by the stepping switch 34 connected in series to the tachogenerator 33, so that, depending on the requirements on the welding speed, one can operate with smaller or larger welding current strengths per unit time. FIG. 4, in particular, shows the advantages according to the invention, which apply in an equal manner to DC arc-welding systems and laser welding devices and result from the fact that the voltage values supplied from the tachogenerator 33 and the fixed voltage source 31 to the summation amplifier do not affect each other and that a common zero point is present.

What is claimed is:

1. A process for controlling welding current or power as a function of welding speed in welding devices for continuous longitudinal-seam welding comprising the steps of:
   controlling the welding current or power in accordance with a control voltage; and
   developing said control voltage by adding a speed-dependent voltage value to an adjustable fixed voltage value.

2. A circuit, for use in a welding system for continuous longitudinal-seam welding, comprising:
   a welding device having an adjustable output power, said device being connectable to a power source;
   a controller having an output connected to said welding device for controlling the power output from the welding device;
   an adjustable fixed voltage source connected to said controller; and
   a welding-speed-dependent tachogenerator for providing a signal in accordance with the welding speed along the longitudinal seam, said signal being provided to the controller, said controller being responsive to said fixed voltage source and said signal for controlling the output power of the welding device.

3. A circuit as described in claim 2, wherein the adjustable fixed voltage source and the welding-speed-dependent tachogenerator are connected in a series circuit, said series circuit being connected to said controller.

4. A circuit as described in claim 3, wherein the welding device is a DC arc-welding system, including a transformer connected to said power source, welding electrodes connected to said transformer to be supplied from said power source, and a control element for adjusting and rectifying welding current, said control element being controlled by the output of said controller.

5. A circuit as described in claim 3, wherein the welding device is a laser welding device having an adjustable output power, the output of said controller being connected to the laser welding device for controlling said output power.

6. A circuit as described in claim 2, additionally comprising a summation amplifier having inputs separately connected to the output of the tachogenerator and to the fixed voltage source and providing an output to an input of said controller.

7. A circuit as described in claim 6, wherein the welding device is a laser welding device having an adjustable output power, said output power being adjusted by the output of said controller.

8. A circuit as described in claim 7, additionally comprising a voltage divider located between the output of the tachogenerator and the input of the summation amplifier. response to the output from said controller, additionally comprising:
   a DC transformer connected between the control element and the electrodes for providing an output having a signal corresponding to the welding current; and
   said controller having a second input connected to the output of the DC transformer.

9. A circuit as described in claim 6, wherein the welding device is a DC arc-welding system including a transformer connected to the power source, welding electrodes connected to said transformer to be supplied from said power source, and a control element for adjusting and rectifying the welding current in response to the output from said controller, additionally comprising:
   a DC transformer connected between the control element and the electrodes for providing an output having a signal corresponding to the welding current; and
   said controller having a second input connected to the output of the DC transformer.

10. A circuit as described in claim 9, additionally comprising a voltage divider located between the output of the tachogenerator and the input of the summation amplifier.

11. A circuit as described in claim 6, additionally comprising a voltage divider located between the output of the tachogenerator and the input of the summation amplifier.

12. A circuit as described in claim 2, wherein the welding device is a DC arc-welding system including a transformer connected to the power source, welding electrodes connected to said transformer to be supplied from said power source, a thyristor/rectifier arrangement connected between the transformer and the welding electrodes, and a series-connected transistor unit disposed between said thyristor/rectifier arrangement and said electrodes, said series-connected transistor unit being controlled by said controller and providing an output to control the thyristor/rectifier arrangement.

13. A circuit as described in claim 12, additionally including a regulating amplifier disposed between the transistor unit and the thyristor/rectifier arrangement.

14. A circuit as described in claim 13, wherein the thyristor/rectifier arrangement includes a 12-pulse rectifier.

15. A circuit as described in claim 13, wherein the thyristor/rectifier arrangement includes a 12-pulse rectifier.

16. A circuit as described in claim 13, additionally comprising a filter element located between the thyristor/rectifier arrangement and the series-connected transistor unit.

17. A circuit as described in claim 12, additionally comprising a filter element located between the thyristor/rectifier arrangement and the series-connected transistor unit.

18. A circuit for a DC arc-welding system for continuous longitudinal-seam welding, comprising;

a transformer being connectable to a voltage source;
welding electrodes connected to said transformer to be supplied from said voltage source;
a thyristor/rectifier arrangement disposed between said transformer and said electrodes for controlling and rectifying welding current;
a controller having an output for controlling said thyristor/rectifier arrangement;
a welding-speed-dependent tachogenerator for developing a voltage in accordance with the welding speed along a longitudinal seam, said voltage being connected to an input of said controller; and
a series-connected transistor unit disposed between said thyristor/rectifier arrangement and said electrodes, said series-connected transistor unit being driven by the output of said controller and providing an output for controlling the thyristor/rectifier arrangement.

* * * * *

UNITED STATES PATENT AND TRADEMARK OFFICE
CERTIFICATE OF CORRECTION

PATENT NO. : 5,192,850

DATED : March 9, 1993

INVENTOR(S) : Brunn et al.

It is certified that error appears in the above-identified patent and that said Letters Patent is hereby corrected as shown below:

At column 6, line 29, after "amplifier." delete the rest of the line in its entirety.

At column 6, lines 30-36, delete in its entirety.

Signed and Sealed this

Fifteenth Day of November, 1994

Attest:

BRUCE LEHMAN

*Attesting Officer*  *Commissioner of Patents and Trademarks*